US012202402B2

(12) United States Patent
Bizal et al.

(10) Patent No.: US 12,202,402 B2
(45) Date of Patent: Jan. 21, 2025

(54) LIGHTING DEVICE WITH LIGHT GUIDE AND SURFACE COATING WITH INCREASING LIGHT TRANSMISSION

(71) Applicant: HELLA GmbH & Co. KGaA, Lippstadt (DE)

(72) Inventors: Ana Bizal, Domzale (SI); Juergen Griebel, Steinen (DE); Robin Hofner, Heilbronn (DE); Christian Nutto, Wembach (DE); Heiko Schoene, Zell im Wiesental (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/200,970

(22) Filed: May 23, 2023

(65) Prior Publication Data

US 2023/0406202 A1    Dec. 21, 2023

(30) Foreign Application Priority Data

May 23, 2022   (DE) ...................... 10 2022 112 949.7

(51) Int. Cl.
*B60Q 3/64*     (2017.01)
*B60Q 3/54*     (2017.01)

(52) U.S. Cl.
CPC    *B60Q 3/54* (2017.02); *B60Q 3/64* (2017.02)

(58) Field of Classification Search
CPC ...... G02B 6/0041; G02B 6/0061; B60Q 3/62; B60Q 3/64
See application file for complete search history.

(56) References Cited

U.S. PATENT DOCUMENTS

| 7,223,008 B2* | 5/2007 | Henriet ................ G02B 6/0018 362/602 |
| 2014/0340920 A1 | 11/2014 | Bayersdorfer |
| 2016/0046089 A1* | 2/2016 | Kanade ................ G02B 6/0041 264/1.24 |
| 2016/0370534 A1* | 12/2016 | Liu ....................... G02B 6/0055 |

FOREIGN PATENT DOCUMENTS

| DE | 102013008433 A1 | 11/2014 |
| DE | 102014200606 A1 | 7/2015 |
| DE | 102017217916 A1 | 4/2019 |

* cited by examiner

*Primary Examiner* — Robert J May
(74) *Attorney, Agent, or Firm* — Muncy, Geissler, Olds & Lowe, P.C.

(57) ABSTRACT

A method for producing a lighting device and a lighting device, comprising a flat light guide extending in a z-direction, wherein the light guide has a thickness, a back side, a front side and circumferential narrow sides, and scattering particles are arranged in its volume. A reflector is arranged at the back of the light guide and at least one light source is optically connected to the light guide for coupling light. Furthermore, the lighting device has a surface coating. In order to provide homogeneous illumination of the interior and a compact lighting device, the surface coating has a light transmission starting from the at least one light source in the z-direction, which increases to the extent that the curve of the light intensity of the at least one light source decreases and the light guide is formed by cohesive back-injection of a carrier foil with the surface coating.

5 Claims, 6 Drawing Sheets

(A - A)

LIGHTING DEVICE WITH LIGHT GUIDE AND SURFACE COATING WITH INCREASING LIGHT TRANSMISSION

This nonprovisional application claims priority under 35 U.S.C. § 119(a) to German Patent Application No. 10 2022 112 949.7, which was filed in Germany on May 23, 2022, and which is herein incorporated by reference.

BACKGROUND OF THE INVENTION

Field of the Invention

The present invention relates to a lighting device for backlighting a trim element in the interior of a vehicle, having a flat light guide for guiding light extending in a z-direction, wherein the light guide has a thickness, a back side, a front side and circumferential narrow sides and has scattering particles in its volume. A reflector is arranged at the back of the light guide and at least one light source is optically connected to one of the narrow sides of the light guide for coupling light. Furthermore, the lighting device has a surface coating which, starting from the at least one light source in the z-direction, has a light transmission that increases to the extent that the curve of the light intensity of the at least one light source decreases. The surface coating is applied to a carrier foil and the light guide is formed by a cohesive back-injection of the carrier foil with the surface coating. The flat light guide forms a cohesive bond of reflector and surface coating or of reflector and carrier foil with surface coating.

Furthermore, the invention relates to methods for producing this lighting device and a backlit interior decoration part.

Description of the Background Art

Lighting devices are installed in the interior of vehicles in order to create ambient lighting by means of flat light guides. The light propagates in the light guide according to the state of the art under the conditions of total internal reflection, so that the light remains in the light guide from the light source to the light extraction and a homogeneous surface illumination can be realized.

In order to cause a total internal reflection of the coupled light in the light guide, the flat light guide is formed of an optically denser medium than the surrounding areas. The refractive index in the adjacent media is smaller than that in the light guide, so that the light is subject to the conditions of total internal reflection. This presupposes that either an air gap surrounds the light guide or that an optically thinner medium, i.e., a different material than the plastic from which the light guide is made, is used. In order to decouple the light from the light guide, decoupling elements are required that are arranged in such a way that the light is decoupled at defined or desired points.

A flat light guide for illuminating an assembly that is installed in the interior of a vehicle is described in DE 10 2013 008 433 A1, which corresponds to US 2014/0340920. The light guide is protected by an optical paint coating, especially in the areas where contamination is to be feared. Furthermore, the optical paint coating has a defined refractive index, which must be matched to the light guide so that it is smaller than that of the plastic of which the light guide is made. The lighting device also contains other additional elements, such as the decoupling elements, which are required for light propagation under total internal reflection. The different material components and the additional elements increase the manufacturing costs.

A disadvantage of the principle of light conduction in flat light guides in the state of the art, which are based on total internal reflection, are the additional layers that have to surround the light guiding layer, so that the total internal reflection of the propagating light can take place at the transition from the optically denser to the optically thinner medium. If the principle of the air gap is used, undesirable friction often occurs in the prior art, as the lighting device undergoes movement and vibration when installed in the vehicle. Friction, in turn, causes unpleasant noises that can bother the occupants of the vehicle. Another disadvantage is the higher structure and thus the additional weight resulting therefrom.

SUMMARY OF THE INVENTION

It is therefore an object of the present invention to provide a method by which a lighting device is easy to manufacture and to provide a lighting device which is compactly designed with few, material-uniform components and which enables a homogeneous flat back lighting in the interior, which does not reveal any hotspots even when viewed up close.

It is also an object to provide a backlit interior decoration part.

In an example, the method includes the steps of: providing a carrier foil extending in a z-direction with a surface coating that allows light transmission; inserting the carrier foil into an injection mold so that the surface coating points into the receiving space of the mold; back-injecting the carrier foil with a plastic containing scattering particles, so that a flat light guide with a front, a back and circumferential narrow sides is produced, which contains scattering particles in its volume and on the front of which the surface coating is displayed; removing the carrier foil, leaving the surface coating on the front of the flat light guide; arranging a reflector at the back of the flat light guide so that a cohesive bond of the light guide with the surface coating and the reflector is formed, and placing at least one light source on a narrow side of the flat light guide. The surface coating can be applied to the carrier foil in such a way that, starting from the at least one light source in the z-direction, the curve of the light transmission of the surface coating increases to the extent that the curve of the light intensity of the at least one light source decreases.

Because the surface coating is applied to the carrier foil, which bonds with the plastic melt during the injection molding process via pressure and temperature and thus is displayed on the front of the flat light guide, this has the advantage that the carrier foil can be removed and the lighting device is even more compact in its design. The structure can be between 2 mm and 5 mm. Forming a cohesive bond of light guide with surface coating and reflector avoids individual parts that can shift against each other and generate disturbing noises, such as squeaking, inside the vehicle. The lighting device also has a low installation height and lower weight due to the small number of individual components.

Since the surface coating near the light source has a transmission of 0%, so that a completely opaque area is created, the surface coating and reflector prevent light from escaping near the light source and thus the light remains in the flat light guide for the time being. Since the transmission increases in the z-direction due to the partially translucent surface coating, exactly inverse to the intensity of the coupled light of the light source, the entire surface appears homogeneously illuminated to the viewer.

A surface coating can be provided which, starting from the at least one light source in the z-direction, has a light transmission which increases to the extent that the curve of the light intensity of the at least one light source decreases, has the advantage that the entire surface of the light guide homogeneously radiates the light of the at least one light source. The perception of the emitted intensity of the light is thus independent of the distance in the z-direction to the light source.

The surface coating can be facing away from the receiving space of the injection mold, so that advantageously the carrier foil is back-injected and the surface coating is facing the interior to be illuminated. Thus, the transillumination of the surface coating is not impaired by the carrier foil and is displayed sharper or clearer. Advantageously, this arrangement close to the surface will display any existing decorative layer or fabric structure.

The carrier foil with the surface coating can remain in the lighting device and has the advantage that one method step is saved and the method for producing the lighting device is accelerated. Advantageously, a protective film is created on the front of the light guide, which is required depending on the application and which protects the light guide from scratches and similar impurities.

Advantageously, the surface coating can be applied to the carrier foil by means of a halftone printing process, in particular by means of a dithering process. Since the software that controls the dithering process is given corresponding input values of the light sources used, a surface coating is created that corresponds to the desired curve. The curve of the light transmission starting from the at least one light source in the z-direction enables homogeneous illumination and avoids hotspots.

The surface coating can be formed from a large number of opaque surface elements and transparent surface elements and that a degree of filling of a unit of area is formed by the opaque surface elements, increases the possibility of designing the curve of the light transmission of the surface coating. Thus, several light sources, even with different light intensities, can be arranged, while respecting the requirement of a homogeneous appearance.

Because the curve of the light transmission can be formed by a different degree of filling per unit of area, a very fine gradation in the curve of the light transmission can be achieved. Thus, a fine gradient of light transmission is generated, which, when viewed up close, does not reveal so-called hotspots, nor individual particles of the surface coating, since only steplessly merging gradations of brightness are recognizable to the viewer.

The curve of the light transmission can be formed from an opaque area to a translucent area in such a way that the opaque surface elements vary in number and distance per unit of area, so that the degree of filling in the z-direction decreases continuously. Advantageously, not only the number of opaque surface elements per unit of area varies, but also the distance between the centers of the opaque surface elements. As a result, the unit of areas receive different degrees of filling, which result in the respective tonal value. The resulting appearance of a continuous curve in the z-direction allows for the smooth transition from an opaque area, over a partially opaque area to a translucent area. This seemingly random distribution of the opaque surface elements is advantageously matched to the coupled light intensity.

Advantageously, the opaque surface elements can be formed from a single hue, especially white, so that at the white opaque surface elements, or at the areas formed by them, the light is reflected back into the light guide.

The opaque surface elements can be of the same size, the curve of the light transmission can be graded very finely and the structure size of the surface elements is not perceptible to the viewer from a normal viewing distance of approx. 30 cm.

Advantageously, the back of the flat light guide can be back-injected with the same plastic as the flat light guide for the production of the reflector, so that a bond is produced in the 2K injection molding process that is stable and one-piece. Due to this one-piece design, the individual elements cannot shift against each other and there is no noise nuisance to the vehicle occupants in the event of vibrations or movements while driving. Assembly is also simplified, as it is only one component that needs to be handled. This also excludes tolerance errors that can be caused with regard to the arrangement of the components, e.g., reflector and light guide, to each other.

The back of the flat light guide can be coated with reflective paint for the production of the reflector and this has the advantage that the lighting device has a slim design and the weight is reduced.

Advantageously, the carrier foil is also made of the same plastic material as the flat light guide. This means that no different materials are used in the lighting device. Using the same material for the parts to be installed not only speeds up the manufacturing process, but also makes it easier. Furthermore, the procurement process is facilitated and a sustainable recycling process is made possible. It is advisable to use a thermoplastic, transparent or translucent plastic, in particular polycarbonate (PC) or polymethyl methacrylate (PMMA), as the material for the plastic.

The above-mentioned object is also achieved with respect to a lighting device.

Because the light guide is formed by cohesive back-injection of a carrier foil with the surface coating and the flat light guide forms a cohesive bond of reflector and surface coating or reflector and carrier foil with surface coating results in a compact device that has the same advantages as described above with respect to the method. In the installation situation, disturbing noises are avoided, since a one-piece and compact lighting device is provided.

A thickness of the light guide can taper from the at least one light source, starting from a first thickness in the z-direction to a second thickness. This reduces the loss of light along the z-direction.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
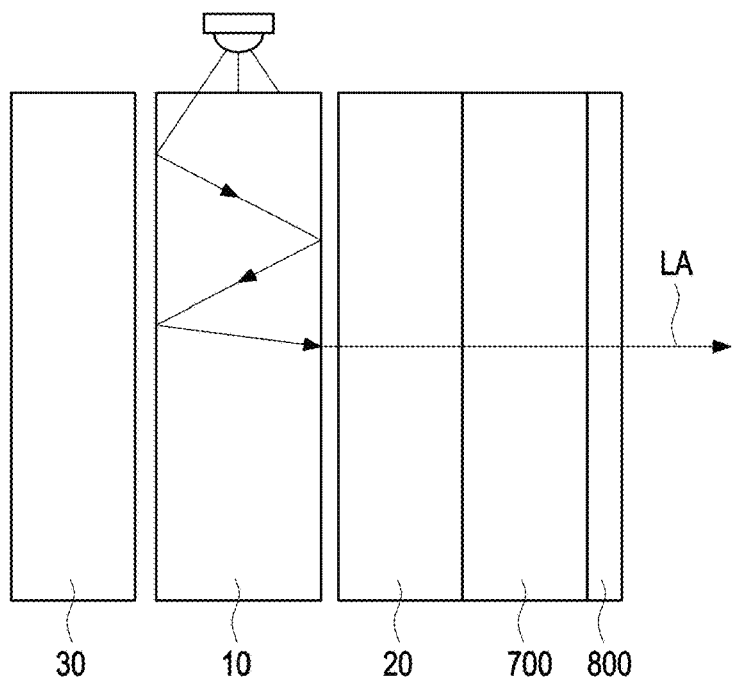
FIG. 1 is a schematic representation of a flat backlight from the conventional art.

FIG. 1 shows the schematic arrangement of a lighting device for backlighting trims, such as door trims in an interior of a vehicle, as it is known in the prior art. Such flat backlights have a light-conducting layer 10 into which the light, which propagates under total internal reflection conditions, is coupled. At the back of the light-conducting layer 10, a housing part or a reflective layer 30 and a decoupling structure are usually arranged so that the light exits towards the interior of the vehicle in a light-emitting direction LA. In this process, the light passes through a translucent carrier layer 20, to which a fabric structure 700 and/or a decorative layer 800 can be applied. In order for the light to be able to propagate in the light-conducting layer 10 by total internal reflection, different refractive indices of the surrounding medium are required on the flat sides. Normally, one layer is left on each side of the light-conducting layer 10, which, with the air contained therein, has a lower optical refractive index than the light-conducting layer 10 in order to meet the conditions for total internal reflection. Furthermore, decoupling particles are required to decouple the light into the interior to be illuminated. This has the disadvantage that, due to the multi-part structure, there is no firm bond of the lighting device, and vibrations while the vehicle is moving can lead to unpleasant or disturbing noises.

Figure 2:
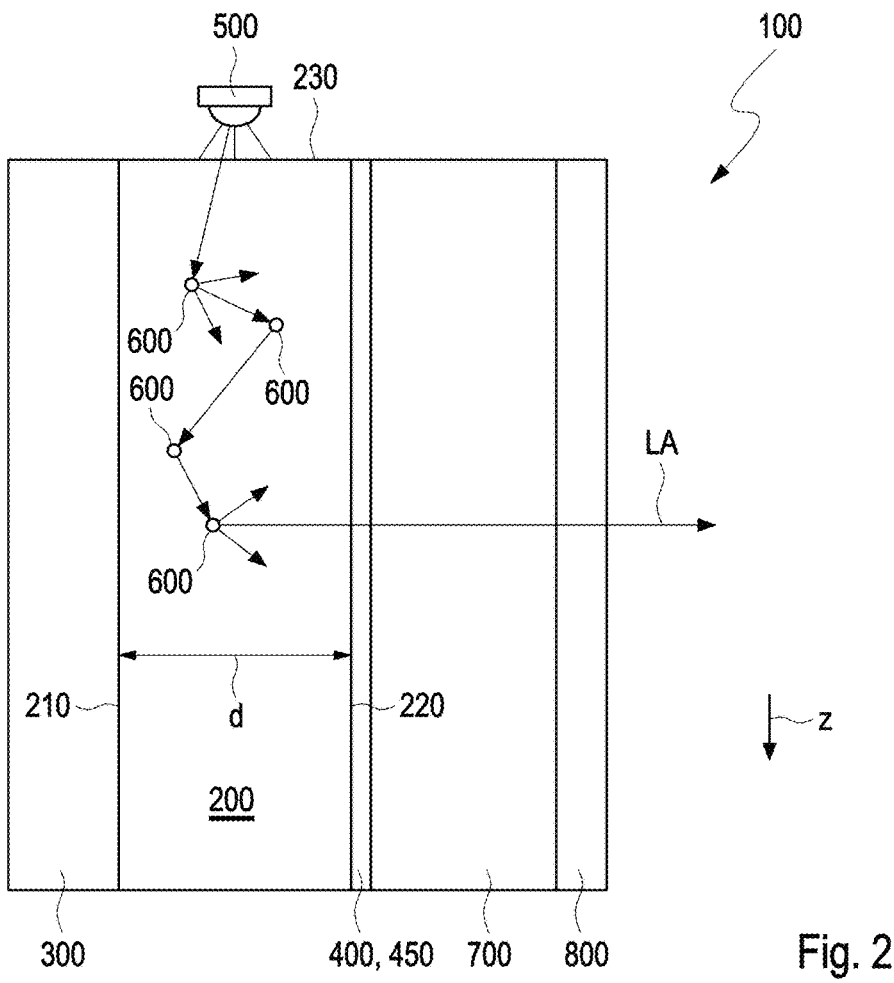
FIG. 2 is a schematic representation of an example of the lighting device according to the invention.

FIG. 2 schematically shows an illumination device according to the invention 100 with a flat light guide 200, which is formed of a cohesive bond with reflector 300 and surface coating 400 or carrier foil 450 with surface coating 400. The light of the light source 500 does not propagate under the conditions of total internal reflection, but by scattering particles 600 arranged in the volume of the light guide 200. Optionally, a fabric structure 700 and/or a decorative layer 800 may be applied to the light emission side LA of the lighting device 100. The light coupling through the at least one light source 500 takes place on one of the circumferential narrow sides 230 of the flat light guide 200, which has a thickness d. The light intensity decreases in the z-direction because the light scatters in all directions at the internal scattering particles 600. The reflector 300, which is located on the back 210, reflects the light in the direction of the front 220 of the flat light guide and thus in the direction of the light emission LA. Likewise, the light is reflected back from the surface coating 400 if it has opaque areas 415. The light source 500 can be designed as a monochromatic LED or RGB LED. Since the light does not propagate under the conditions of total internal reflection, no air gap is required in the lighting device 100 according to the invention. Also, the components adjacent to the flat light guide 200, such as the reflector 300 and/or carrier foil 450, can be made of the same material as the light guide 200 and thus have the same refractive index. This reduces the installation height of the lighting device to be installed. In this type of light propagation in the light guide 200, decoupling elements are dispensed with, which would have to include a further manufacturing step, for example by imprinting structures, and would incur additional costs. Due to the type of light propagation, there is also the advantage that the light guide 200 and the reflector 300 can be made of the same material, such as polycarbonate (PC), or that both components are made of polymethyl methacrylate (PMMA). Likewise, the carrier foil 400 can be made of the same plastic material, as it is not used to comply with total internal reflection conditions. Instead of an injection-molded part, the reflector 300 can also be applied as a reflective layer of paint to the back of the flat light guide 200 to prevent light from escaping from the back. A well-reflective layer of paint, especially white, is advantageous.

In the case of edge feeding of the light via the narrow side 230, multiple coupling points for multiple light sources 500 may be provided. In terms of transmission, the surface coating 400 is tailored in the z-direction to the light coupling.

Figure 3:
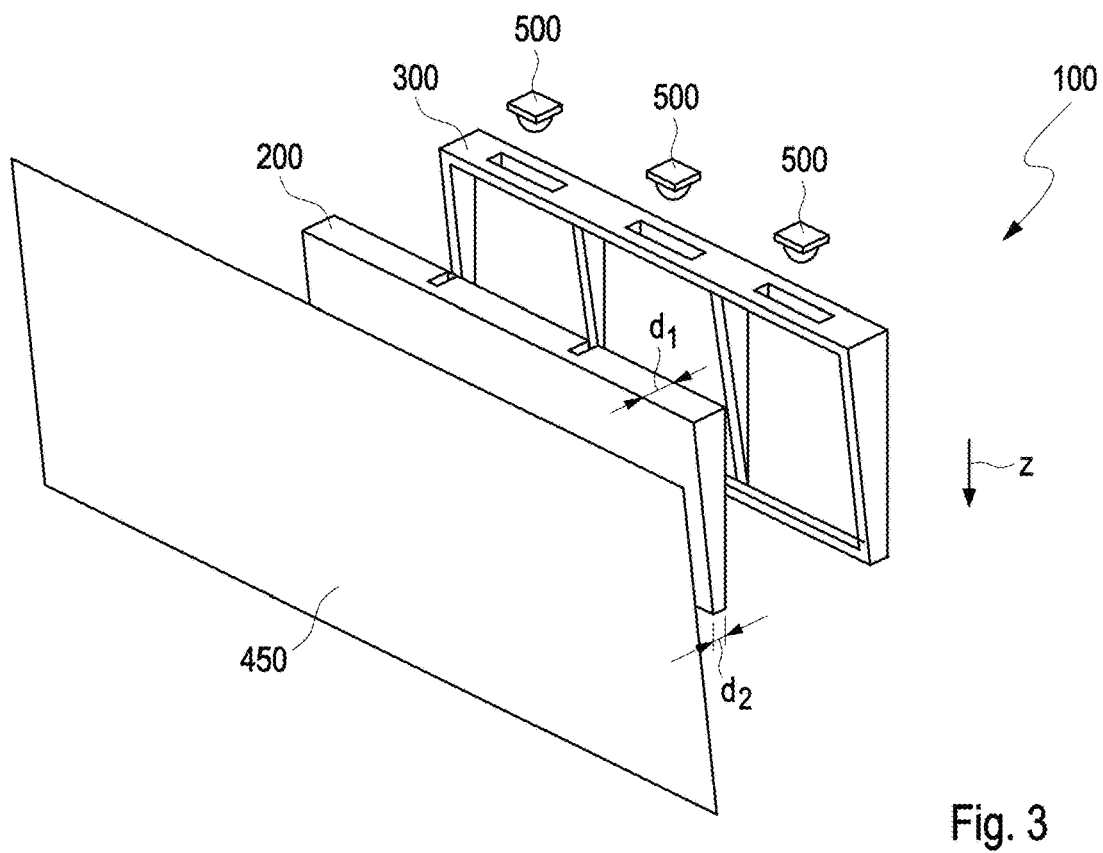
FIG. 3 is an exploded view of an example lighting device.

FIG. 3 shows a first embodiment of the lighting device 100 according to the invention, which shows the flat light guide 200, the thickness d uniformly tapers as a function f(z) of the distance from a first thickness $d_1$ from the at least one light source 500, starting in the z-direction, to a second thickness $d_2$. The fact that the light guide 200 tapers further ensures homogeneous light extraction. The reflector 300 can be adapted to this special geometry as an injection-molded part. By tapering the flat light guide 200, the loss of light intensity I is counteracted with increasing distance from the light source 500 in the z-direction. This effect can be further enhanced by increasing the number of scattering particles 600 starting from the light source 500 in the z-direction. The flat light guide 200 is produced by back-injection of the carrier foil 450 in order to obtain a cohesive bond of the lighting device 100. The carrier foil 450 is transparent and may be made of the same plastic material as the flat light guide 200 and the reflector 300, since the light propagation in the light guide 200 occurs independently of the optical density of the surrounding materials. Since the reflector 300 in the 2k injection molding process is designed to fit the lighting device, bars can be seen in this embodiment between the individual illuminated areas, which are arranged between the light sources 500 and separate them from each other. Advantageously, there are no superimpositions when the light of the individual light sources 500 propagates in the z-direction.

Figure 4:
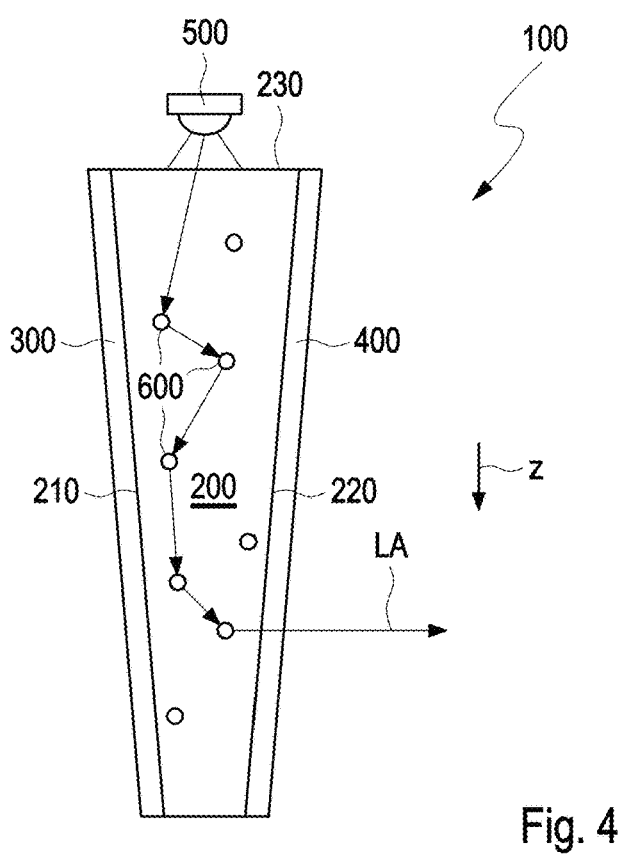
FIG. 4 is a side view of FIG. 3.

FIG. 4 shows the light propagation in the flat light guide 200 of the embodiment according to FIG. 3. The light of the light source 500 enters on a narrow side 230, is diffusely scattered on the scattering particles 600 and decreases in light intensity in the z-direction. In order to prevent unwanted light emission to the back 210 of the flat light guide 200, the reflector 300 is connected to the back 210 of the flat light guide by means of a 2-component injection molding process. Alternatively, the reflector 300 may be designed as a reflective coating, which also ensures that the coupled light cannot escape from the back of the light guide 200. At the front 220 of the light guide 200 is the surface coating 400, which has a light transmission T which is inverse to the curve of the light intensity I. As the light intensity I decreases, the light transmission T of the surface coating 400 increases. Thus, in addition to the tapering of the light guide 200 in the z-direction, a homogeneous light emission in the light emission direction LA is effected.

Figure 5:
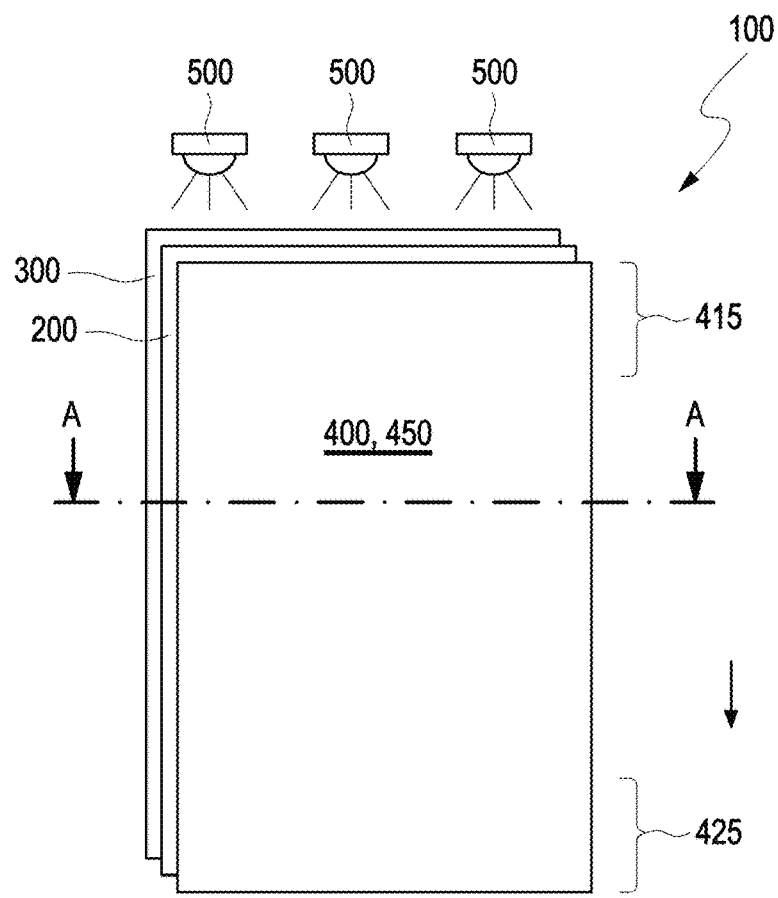
FIG. 5 is a front view of the lighting device.

The surface coating 400 of the carrier foil 450 is shown in FIG. 5 in a front view. In a first step, the flat light guide 200 is produced by back-injection of the carrier foil 450. For this purpose, the carrier foil 450 with surface coating 400 is inserted into the injection mold, fixed by means of a vacuum and then back-injected with the plastic. Under heat and pressure, the introduced plastic welds to the carrier foil 450 to form the flat light guide 200. The reflector 300 is cohesively connected to the back 210 of the flat light guide 200 in a second step in the injection molding process. The surface coating 400 can remain on the carrier foil 450. Following an IML (In Mold Labeling) process, the carrier foil 450 with surface coating 400 and light guide 200, together with the reflector 300, become an inseparable unit, thus enabling the permanent and precise placement of the surface coating 400. This means that there is no detachment, yellowing or slipping of the surface coating 400.

A further embodiment of the lighting device 100 is made possible by adhesively transferring or imaging the surface coating 400 to the front 220 of the flat light guide 200 by an IMD process (In Mold Decoration) during injection molding and removing the carrier foil 450. As a result, the lighting device 100 gets a smaller structure and it becomes lighter. The light of the light source 500 is fed through the edge of the flat light guide 200 and exits through the translucent regions or through the partially translucent regions of the surface coating 400. A section A-A through the lighting device 100 is shown in FIG. 6.

Figure 6:
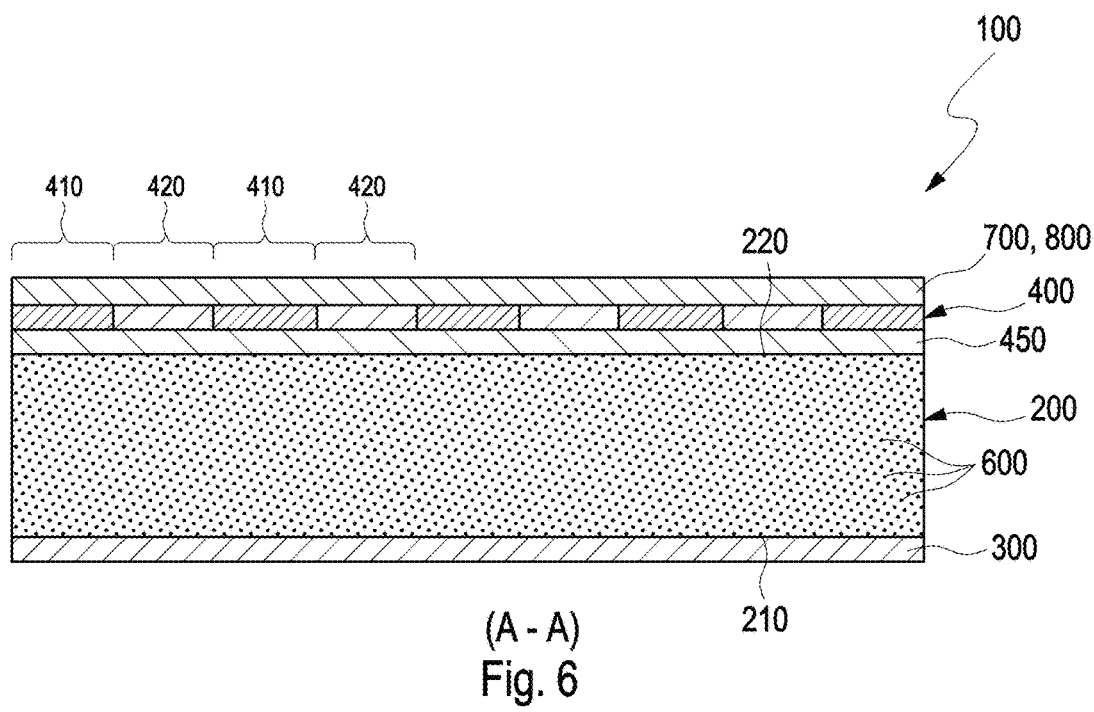
FIG. 6 is a sectional view of FIG. 5, FIGS. 7A to 7C show single views.

FIG. 6 shows the section A-A from FIG. 5. The transmission of the surface coating 400 of FIG. 5 increases in the z-direction as the light intensity of the light source 500 decreases. For this purpose, opaque area 415 and translucent area 425 of the surface coating 400 are formed by a halftone printing process, in particular a dithering process. The section A-A through the lighting device 100 is at a local light transmission T of the surface coating 400 of approx. 50%, in which there is an equal distribution of opaque surface elements 410 and transparent surface elements 420. Optionally, a fabric structure 700 and/or a decorative layer 800 can be applied to the surface coating 400 to enhance the interior. This also eliminates the need for an additional carrier part for the decorative layer, as the flat light guide 200 serves as a carrier for the decorative layer 800, for example. This layer, made of leather or textile, for example, is at least partially transparent. If the light guide 200 is produced with the scattering particles 600 contained in the plastic by back-injecting the carrier foil 450 in the IML process (In Mold Labeling), the carrier foil 450 remains with the surface coating 400 in the lighting device 100, as shown in this embodiment. The reflector 300 is molded or coated on the back of the light guide 210 in a cohesive manner 210.

Figure 7:
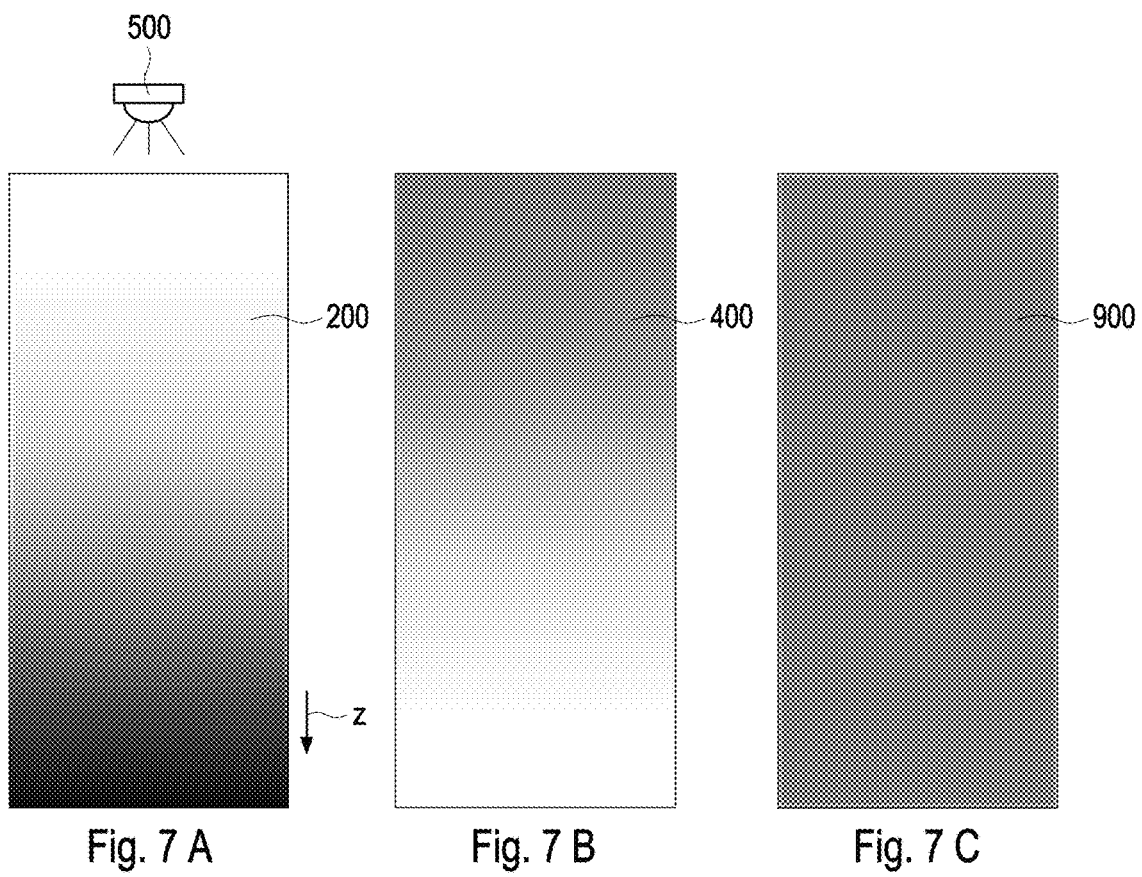

FIGS. 7A, 7B and 7C show the intensity curve in the light guide 200, the surface coating 400 and, as the illuminated area 900, the result of the interaction. FIG. 7A shows the intensity curve of the light intensity I of the coupled light in the flat light guide 200. Starting from the light source 500 to the opposite end of the flat light guide 200, the light intensity I decreases in the z-direction. The decrease in light intensity I results in inhomogeneous area illumination, which is undesirable. This is compensated by the surface coating 400. The curve of the light transmission T of the surface coating in the z-direction is shown in FIG. 7B. Because the surface coating 400 is designed by the arrangement of the opaque and transparent surface elements 410, 420 according to the invention, a very fine curve is created, which has smooth transitions between opaque areas and translucent areas. The individual surface elements 410, 420 are not recognizable, since the arrangement of these very small elements results in a very fine gradient. This fluid curve in the z-direction is shown schematically in FIG. 7B. The light transmission T of the surface coating 400 is inverse to the curve of the light intensity I, which also depends on the number of light sources 500 and also their individual power or light intensity. Since the surface coating 400 is arranged accordingly at the front 220 of the flat light guide 200, i.e., in the direction of light emission LA, FIG. 7C shows the illuminated area 900 as a result. The result is homogeneous illumination without hotspots or individual opaque surface elements being recognizable. The lighting in the interior of a vehicle is shown here as a full-surface illuminated area 900.

Due to the finely structured gradient of the surface coating 400 produced in the halftone printing process, a gradual, continuously variable transition is created from the point of the brightest illumination when light is coupled to the more distant areas that are not so strongly illuminated. When the flat light guide 200 is backlit, even when viewed from a normal viewing distance of, for example, 30 cm, no individual particles can be detected, not even on smaller areas to be illuminated, as shown for example in FIG. 8C as a symbol contour.

Figure 8:
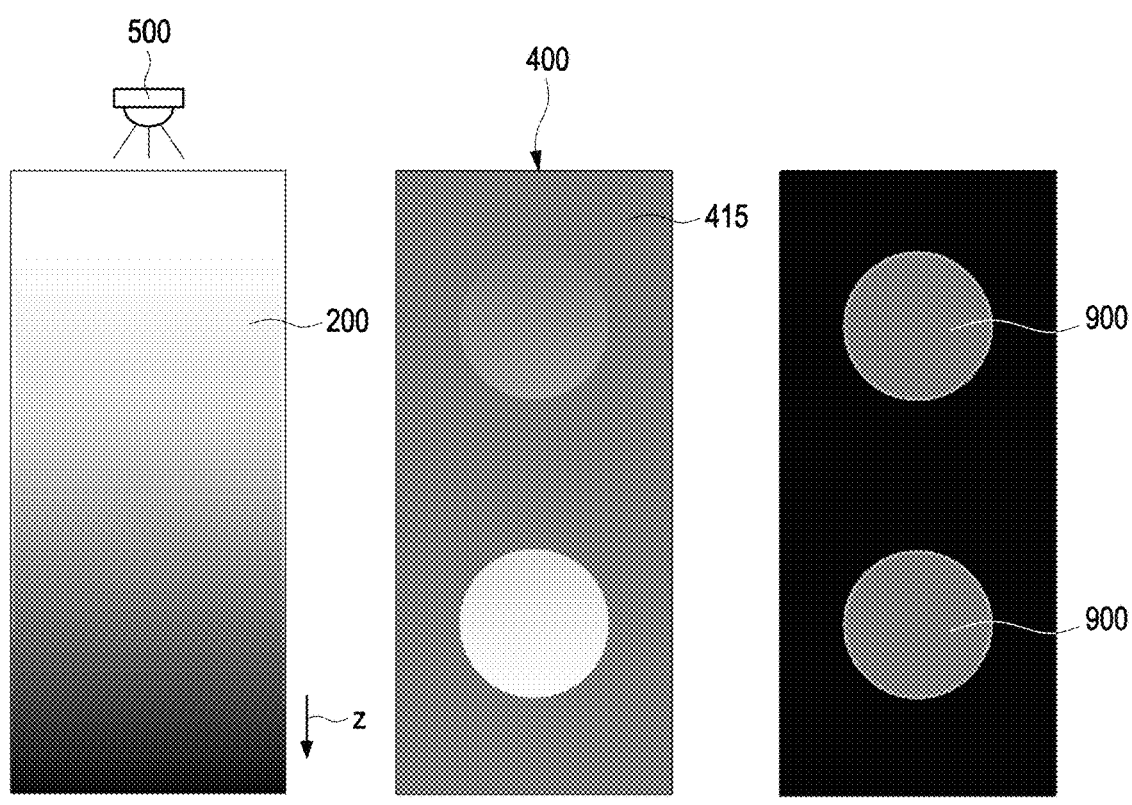
FIGS. 8A to 8C show single views of an example.

FIGS. 8A to 8C show another embodiment. The decreasing intensity curve of the light in the flat light guide 200, from the light source 500 in the z-direction, is shown analogously to FIG. 7A in FIG. 8A. FIG. 8B shows the surface coating 400, which, with the exception of the two recesses, here exemplified as a symbol contour, a circular geometry, is designed over the entire surface as an opaque area 415. The recesses should appear homogeneously illuminated to the viewer. In order to give these illuminated areas 900 a homogeneous appearance, the light transmission T of the surface coatings 400 is designed exactly at these recesses accordingly inverse with the curve of the intensity I of the light. In FIG. 8C, the result can be seen as a homogeneously illuminated area 900.

The surface coating 400 not only provides homogeneous illumination of a larger area of approx. 600 mm×200 mm, but also a contour sharpening of backlit symbols.

Figure 9:
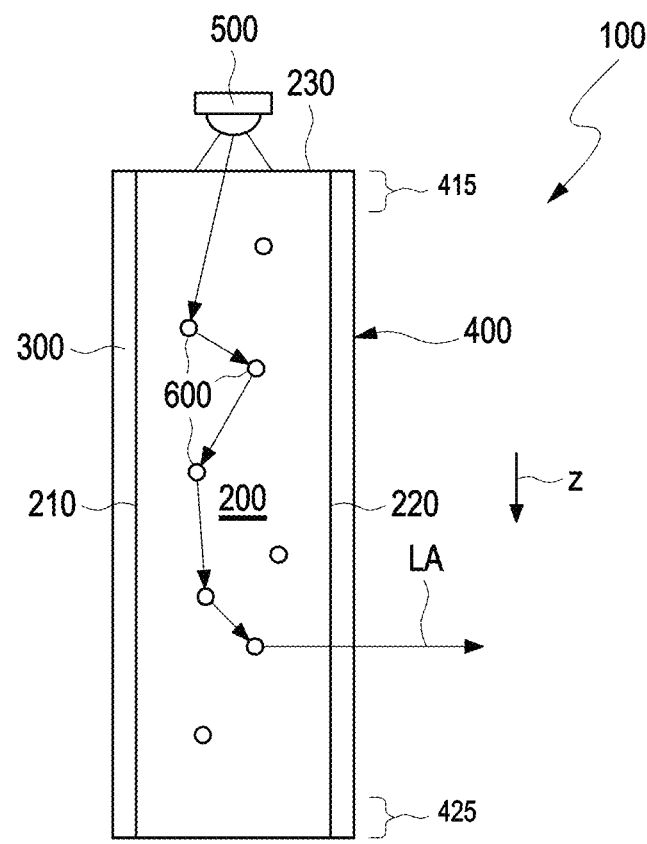
FIG. 9 is a schematic side view of the lighting device.
Figure 10:
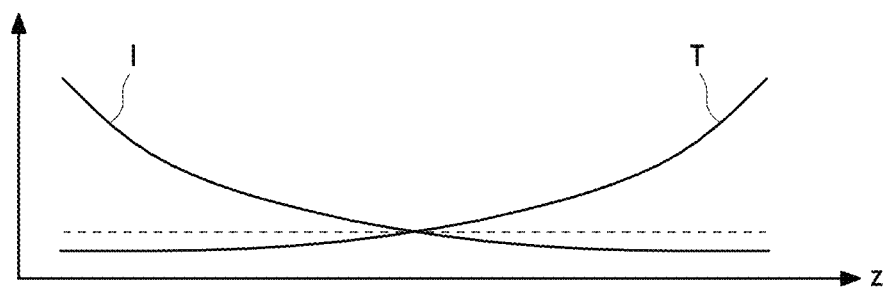
FIG. 10 shows a graph.

FIGS. 9 and 10 show the interaction of the curve of the light intensity I with the inverse curve of the light transmission T of the surface coating 400, as a function of the z-direction. Starting from the light source 500, the light propagates in the z-direction by scattering at the scattering elements 600. The number and arrangement of the scattering particles 600, in addition to the surface coating 400, can cause the light intensity z-direction to decrease more slowly. If fewer scattering particles 600 are arranged in the vicinity of the light source 500 in the volume of the flat light guide 200, light is transported in the z-direction, which has a higher intensity at a greater distance from the light source 500 than with a uniform distribution of the scattered particles 600 along the z-direction. The scattering particles 600 may be formed as nanoparticles with an average diameter of less than 500 nm, preferably less than 300 nm, in particular light diffusing (LD) elements LD12 to LD96 are used. By using these elements as scattering particles 600, additional hotspots can be avoided. The light is reflected at the reflector 300 and the opaque areas 415 of the surface coating and transmitted in the z-direction. Since the light intensity L decreases in the z-direction, the light in the light-emitting direction LA would be perceived as inhomogeneous illumination. The curve of the light transmission T of the surface coating 400 increases according to the light intensity I in the z-direction in such a way that homogeneous illumination is achieved for the viewer as a result. The result is represented by the dotted line in FIG. 10. This makes it clear that uniform illumination takes place over the entire extension in the z-direction.

Figure 11:
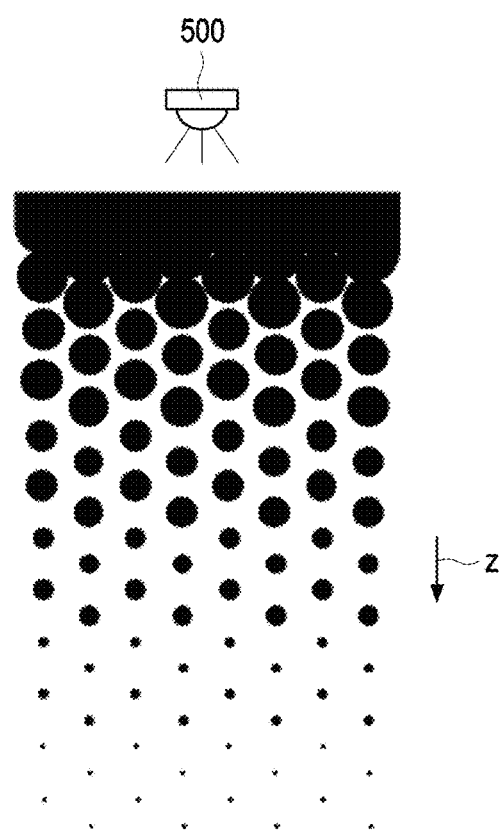
FIG. 11 shows printing.

FIG. 11 shows a well-known printing of a film with, for example, INK-JET particles, which vary in size and density, but the distance between the individual centers of the particles is maintained. This is intended to provide shading in the vicinity of the light source 500, which avoids the hotspots and increases the light transmission in the z-direction.

However, it has been shown that the particles of FIG. 11 are perceived as an unpleasant disturbance by the viewer at a normal viewing distance of about 30 cm. In order to make the curve continuous, so that the viewer does not experience any irritation, a gradient is generated according to the invention, which does not exhibit abrupt changes between the opaque area 415 in the vicinity of the light source 500 and the translucent area 425 in the z-direction further away from the light source, see FIG. 12. Also, the area that lies between these two areas, which is referred to as partially opaque, should provide a quiet or continuous curve of light transmission T. For this purpose, the surface coating 400, formed of opaque surface elements 410 and transparent surface elements 420, is designed in such a way that a continuous curve is achieved with a precisely calculated random distribution of the elements. The exact calculation of the distribution is carried out with the help of a computer program, depending on process parameters, such as light intensity or number of light sources.

If the surface of the conductor is printed, as is customary in the state of the art, there is a risk of damage to the surface, which would have a negative effect on the light emission. The disadvantage is that there is a large amount of work involved, as the light guide has to be carefully machined. This results in a slow and therefore costly manufacturing process. Furthermore, the handling of the light guides during printing increases the risk of damage to the surface by scratches and thus increased rejects.

Figure 12:
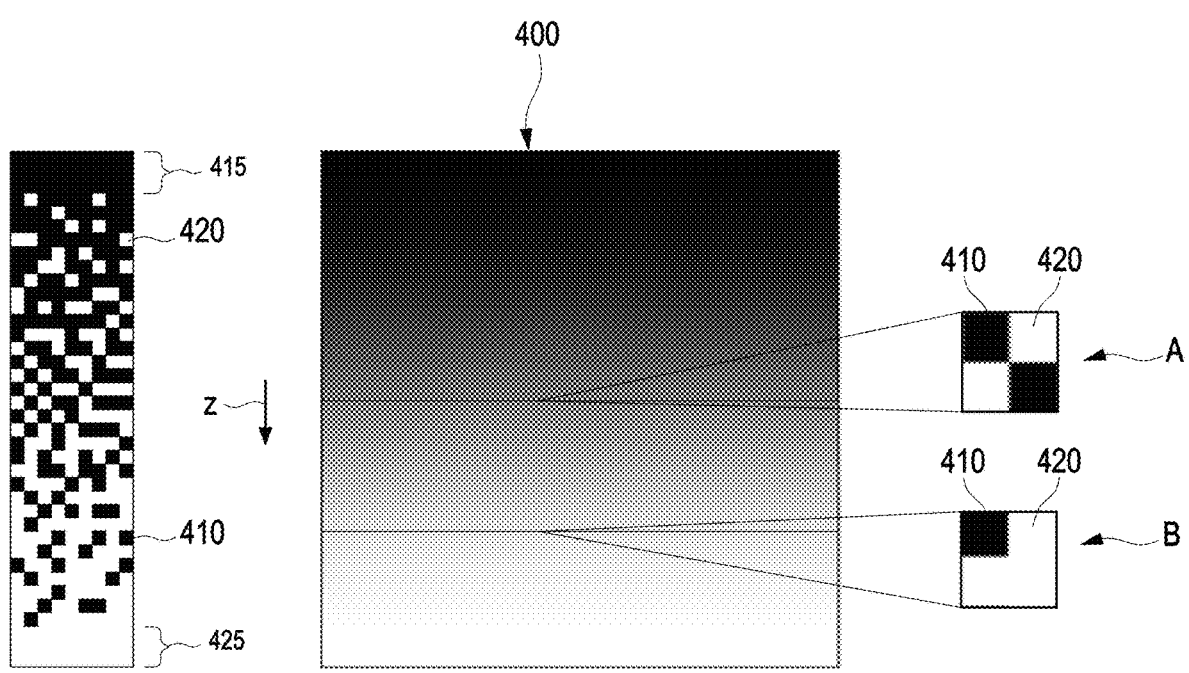
FIG. 12 shows surface coating with detailed view.

In FIG. 12, in addition to the curve, the individual opaque surface elements 410, the arrangement of which was determined in advance in accordance with the requirements of the lighting device 100, and the transparent surface elements 420, are shown in an enlarged view. They are applied to the carrier foil 450 by means of a halftone printing process, in particular by means of a dithering process. The surface coating 400 of the lighting device 100 according to the invention shows a curve in the z-direction in which the light transmission T increases. Due to the close arrangement of the opaque surface elements 410, a very fine structure of the surface coating 400 is realized. For the viewer, backlighting of the surface coating 400 results in no gradations, disturbing particles or hotspots.

For example, if the first digit A in FIG. 12 is considered, where the local transmission is 50%, the opaque surface elements 410 and the transparent surface elements 420 are evenly distributed on a viewed unit of area, shown here as a square. This uniform distribution of the opaque surface elements 410 and transparent surface elements 420 results in a filling degree of a unit of area of 50%, which is determined by the opaque surface elements 410. In other words, the curve of the light transmission of the surface coating 400 is obtained at this point by an equal number of opaque surface elements 410 and transparent surface elements 420 per unit of area. The degree of filling of the unit of area decreases in the z-direction, since the number of opaque surface elements 410 decreases the further the transmission curve is viewed in the z-direction. The unit of area at position B shows a transmission of about 75%, at which the number or degree of filling of the opaque surface elements 410, of the viewed unit of area, decreases and thus the transparent surface elements 420 increase.

A schematic of the calculated random distribution of the opaque surface elements 410 is also shown in FIG. 12. Starting from the at least one light source 500 in the z-direction, the curve of the light transmission T of the surface coating 400 is shown by the schematic arrangement of opaque and transparent surface elements 410, 420. The different fill values of the unit of areas, for example in the opaque area 415 the fill value is 100%, result in the continuous curve from opaque to translucent. The fill value in the translucent region 425 is 0% because no opaque surface elements 410 are arranged. Opaque surface elements 410 placed close together result in the opaque area 415 and in places where the opaque surface elements are scattered only sporadically over a larger area, there are partially translucent or partially opaque areas lying between the areas 415 and 425. As a result, a curve from the opaque region 415 to the translucent area 425, which is formed by the degree of filling, is possible. As a result of the fact that the number and distance of the opaque surface elements 410 per unit of area are continuously reduced, the opaque region 415 continuously transitions into the translucent region 425. If the opaque surface element 410 is designed with white printing ink, there is also a good reflection of the light back into the flat light guide 200. Alternatively, any other color from the CMYK colors can be selected as the printing color, wherein the transparent surface elements 420 are to be regarded as an unprinted dot.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device for backlighting a trim element in an interior of a vehicle, the lighting device comprising:
    a flat light guide for guiding light extending in a z-direction, the flat light guide having a thickness, a back, a front and circumferential narrow sides, with scattering particles being provided inside of the flat light guide;
    a reflector arranged on the back of the flat light guide;
    at least one light source that is optically connected to one of the narrow sides of the flat light guide for coupling light;
    a surface coating which has a light transmission in the z-direction which increases to the extent that a curve of the light intensity of the at least one light source decreases; and
    a carrier foil provided between the surface coating and the flat light guide, the surface coating being applied to the carrier foil,
    wherein the flat light guide is formed by cohesive back-injection of the carrier foil with the surface coating and the flat light guide forms a cohesive bond of the reflector and the surface coating or of the reflector and the carrier foil with the surface coating.

2. The lighting device according to claim 1, wherein the flat light guide is formed with the surface coating and with the reflector in one piece.

3. The lighting device according to claim 1, wherein the surface coating has a different number of opaque surface elements per unit of area, which are arranged with a varying center spacing distance from each other.

4. The lighting device according to claim 1, wherein the thickness of the flat light guide tapers from the at least one light source, and from a first thickness d1 in the z-direction to a second thickness d2.

5. The lighting device according to claim 1, wherein the front of the flat light guide is provided with a decorative layer.

* * * * *